US009248749B2

(12) United States Patent
Kaneyasu et al.

(10) Patent No.: US 9,248,749 B2
(45) Date of Patent: Feb. 2, 2016

(54) VEHICLE CHARGING EQUIPMENT (71) Applicant: Hitachi Metals, Ltd., Tokyo (JP)

(72) Inventors: Masayoshi Kaneyasu, Itabashi (JP); Takafumi Kai, Isehara (JP); Hiroyuki Yanagisawa, Hitachi (JP); Hiroyuki Ito, Kasama (JP); Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 194 days.

(21) Appl. No.: 14/151,685

(22) Filed: Jan. 9, 2014

(65) Prior Publication Data
US 2014/0197791 A1 Jul. 17, 2014

(30) Foreign Application Priority Data

Jan. 11, 2013 (JP) .................................. 2013-003660

(51) Int. Cl.
*B60L 11/18* (2006.01)
*B60L 3/00* (2006.01)
*B60L 3/04* (2006.01)

(52) U.S. Cl.
CPC ........... *B60L 11/1816* (2013.01); *B60L 3/0023* (2013.01); *B60L 3/04* (2013.01); *B60L 11/1824* (2013.01); *B60L 11/1846* (2013.01); *B60L 2230/12* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .................................................... B60L 11/1816
USPC ........................................................ 320/109
See application file for complete search history.

(56) References Cited

U.S. PATENT DOCUMENTS

| 5,614,808 A * | 3/1997 | Konoya | ............... B60L 11/1818 320/109 |
| 2010/0235006 A1* | 9/2010 | Brown | ................... B60L 11/182 700/286 |
| 2012/0249066 A1* | 10/2012 | Ichikawa | ............... B60K 6/445 320/109 |

(Continued)

FOREIGN PATENT DOCUMENTS

| JP | 2010-222793 A | 10/2010 |
| JP | 2011-63944 A | 3/2011 |
| JP | 2011-111805 A | 6/2011 |

*Primary Examiner* — M'Baye Diao
(74) *Attorney, Agent, or Firm* — McGinn IP Law Group, PLLC (57) ABSTRACT

A vehicle charging equipment includes a charging equipment main body, a charging cable, a charge connector to be fitted to a vehicle-side connector and having a release button, a release button circuit to which voltage is applied from the vehicle to detect depression of the release button, a winding-up device to wind up the charging cable, a fit determination means for determining the fitting of the charge connector to the vehicle-side connector, and an automatic winding-up controller. The fit determination means includes a voltage detection unit and a fit determination portion, the voltage detection unit detecting voltage applied to the release button circuit to detect depression of the release button, and the fit determination portion determining the fitting of the vehicle-side connector based on the voltage detected. The automatic winding-up controller determines removal of the charge connector from the vehicle-side connector based on the determination by the fit determination means.

7 Claims, 8 Drawing Sheets (56) References Cited

U.S. PATENT DOCUMENTS

| | | | | |
|---|---|---|---|---|
| 2013/0113425 A1* | 5/2013 | Kauffmann | ............ | H02J 7/0042 320/109 |
| 2014/0048638 A1* | 2/2014 | Falk | .................... | B60L 11/1816 242/385 |
| 2014/0111158 A1* | 4/2014 | Kinomura | ............ | H02G 3/0493 320/109 |
| 2014/0117144 A1* | 5/2014 | Kinomura | ............ | B65H 75/425 242/590 |
| 2014/0176070 A1* | 6/2014 | Krammer | ............ | B60L 11/1818 320/109 |

\* cited by examiner

VEHICLE CHARGING EQUIPMENT

The present application is based on Japanese patent application No. 2013-003660 filed on Jan. 11, 2013, the entire contents of which are incorporated herein by reference.

BACKGROUND OF THE INVENTION

1. Field of the Invention

The invention relates to a vehicle charging equipment for charging vehicles such as electric and hybrid vehicles.

2. Description of the Related Art

A vehicle charging equipment for charging vehicles such as electric and hybrid vehicles is known, which is provided with a charging equipment main body, a charging cable pulled out of the charging equipment main body and a charge connector which is attached to the tip of the charging cable and is to be fitted to a vehicle-side connector (charge port, inlet) provided on a vehicle.

For charging a vehicle using such a vehicle charging equipment, the charging cable is pulled out of the charging equipment main body and the charge connector is fitted (connected) to the vehicle-side connector of the vehicle.

It is desirable that the charge connector and the charging cable be put back into the original state (i.e., the state in which the charging cable is wound-up and stored in the charging equipment main body and the charge connector is arranged in the vicinity of the charging equipment main body) after finishing charging but it is not always retracted properly.

Especially in public parking spaces, a large number of unspecified vehicles frequently come in and out and charging cables of vehicle charging equipments provided in such places thus may be left uncared-for in the pulled-out state without being retracted properly.

In such a case, the charge connector or charging cable which are left uncared-for may be run over and damaged by in-coming vehicles or pedestrians may trip over such a charging cable, etc., and get injured. Furthermore, when the vehicle charging equipment is adapted to be provided on each pallet of mechanical parking facility, the charging cable hanging down from the pallet may get stuck and damaged in a carriage rail, etc., when the pallet moves, which is very dangerous. Therefore, the charge connector and the charging cable are desired to be automatically retracted after finishing charging.

In order to automatically retract the charge connector and the charging cable, removal of the charge connector from the vehicle-side connector needs to be detected in the charging equipment main body which is provided with a winding-up device for winding up the charging cable, and it is thus necessary to provide a fit determination means to determine whether or not the both connectors are fitted to each other.

In SAE J1772 (trademark, herein referred to as J1772 standard) defined by the Society of Automotive Engineers (SAE) and IEC 62196 part 3 (herein referred to as 62196 standard) defined by International Electrotechnical Commission (IEC), a means for determining whether or not the charge connector is fitted to the vehicle-side connector is preliminarily provided.

Figure 7:
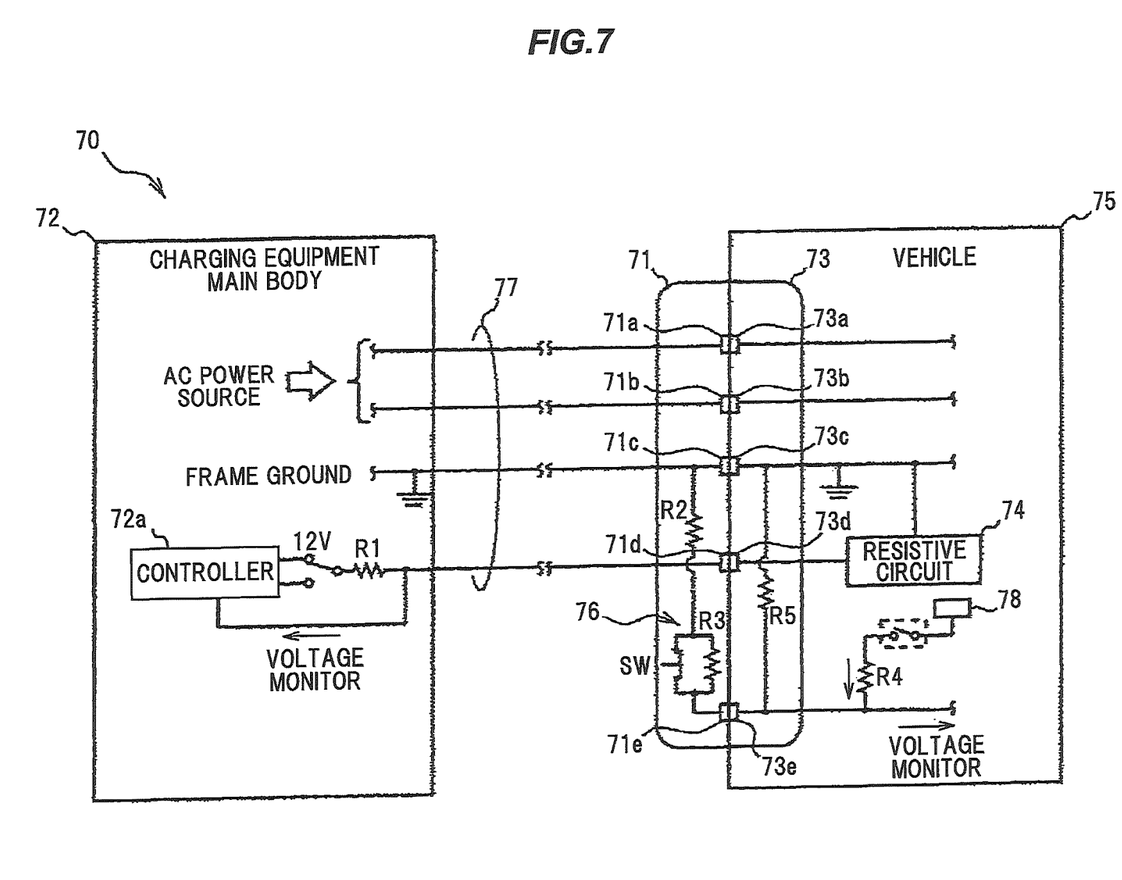
FIG. 7 is a circuit diagram illustrating a conventional vehicle charging equipment.

In detail, as shown in FIG. 7, a charge connector 71 conforming to the J1772 standard is provided with five terminals: two AC power source terminals 71a and 71b (neutral lines) through which AC power signals are transmitted; a ground terminal 71c to be a frame ground; and two signal terminals 71d and 71e. A vehicle-side connector 73 is provided with terminals 73a to 73e which respectively correspond to the terminals 71a to 71e of the charge connector 71. Meanwhile, in the 62196 standard, two more AC power source terminals are further provided in addition to the five terminals and are used together with the AC power source terminal 71a to supply three-phase AC power.

In the J1772 standard as well as in the 62196 standard, DC voltage (+12V) is applied to the signal terminal 71d from a controller 72a of a charging equipment main body 72 via a resistor R1 and the controller 72a monitors voltage (potential) of the signal terminal 71d. When the charge connector 71 is fitted to the vehicle-side connector 73, the signal terminal 71d is electrically connected to the signal terminal 73d of the vehicle-side connector 73 and is grounded via a resistive circuit 74 formed on a vehicle 75, which forms a closed loop and causes variation in voltage of the signal terminal 71d. In the J1772 standard, the voltage of the signal terminal 71d is detected by the controller 72a and fitting of the two connectors 71 and 73 is determined based on the detected voltage.

The signal terminal 71e of the charge connector 71 is used for detecting depression of a release button which is provided on the charge connector 71.

The release button is provided integrally with a locking mechanism such as latch for locking to the vehicle 75 when the two connectors 71 and 73 are fitted to each other, and it is configured such that the locking mechanism is released by pressing the release button and the fitting of the two connectors 71 and 73 is then released. Since the release button is always pressed when removing the charge connector 71 from the vehicle-side connector 73, detecting the depression of the release button allows disengagement of the two connectors 71 and 73 to be detected beforehand and charging current to be promptly reduced. As a result, it is possible to significantly reduce, e.g., damage on charging devices such as storage batteries caused by transient impact due to current interruption during charging large current, or burnout of a contact due to spark discharge caused by turning off a relay circuit while power is on.

A release button circuit 76 is provided with a switch SW opened by pressing the release button and two resistors R2 and R3, and is configured such that one end of the switch SW is connected to the signal terminal 71e, another end of the switch SW is connected to the ground terminal 71c via the resistor R2 and then the resistor R3 is connected in parallel to the switch SW. In a conventional vehicle charging equipment 70, the release button circuit 76 is completed within the charge connector 71 and a circuit, etc., related to the release button is not provided in the charging equipment main body 72. The charge connector 71 and the charging equipment main body 72 are connected via a four-core charging cable 77.

In vehicle 75, voltage is applied to the signal terminal 73e from a DC power source 78 via a resistor R4 and voltage of the signal terminal 73e is monitored. When the two connectors 71 and 73 are fitted to each other, the signal terminal 73e is electrically connected to the signal terminal 71e of the charge connector 71 and voltage is then applied to the release button circuit 76. In the release button circuit 76, the switch SW is closed and the resistor R3 is shorted when the release button is not pressed, but once the release button is pressed, the switch SW is opened and the resistor R3 is inserted. Accordingly, a resistance value from the signal terminal 73e up to the frame ground (a combined resistance value of the release button circuit 76 and a resistor R5) varies due to depression of the release button and voltage of the signal terminal 73e thus varies. Therefore, it is possible to detect depression of the release button by detecting variation in voltage of the signal terminal 73e on the vehicle 75 side.

Such a mechanism for detecting depression of the release button is essential to prevent damage on charging equipment in vehicle and is widely adopted, not just for the J1772 standard and the 62196 standard.

The related arts to the invention may be JP-A-2010-222793, JP-A-2011-063944 and JP-A-2011-111805.

SUMMARY OF THE INVENTION

The conventional vehicle charging equipment 70 has the problem that, when the vehicle 75 to be charged does not conform to the J1772 standard or when the resistive circuit 74 in FIG. 7 is not provided, it is not possible for the charging equipment main body 72 to detect whether or not the connectors 71 and 73 are fitted to each other. Therefore, it is not possible to automatically retract the charge connector 71 and the charging cable 77 after the charging is completed. The same applies to vehicles that conform only to the 62196 standard.

It is an object of the invention to provide a vehicle charging equipment that is adapted to automatically retract a charge connector and a charging cable regardless of which standard the vehicle conforms to.

(1) According to one embodiment of the invention, a vehicle charging equipment comprises:

a charging equipment main body;

a charging cable to be pulled out of the charging equipment main body;

a charge connector that is provided at a tip of the charging cable, is to be fitted to a vehicle-side connector on a vehicle and has a release button to be pressed for removal from the vehicle-side connector;

a release button circuit to which voltage is applied from the vehicle to detect depression of the release button, the release button circuit having a resistance value that varies depending on whether or not the release button is pressed;

a winding-up device on the charging equipment main body to wind up the charging cable;

a fit determination means for determining whether or not the charge connector is fitted to the vehicle-side connector; and an automatic winding-up controller for controlling the winding-up device to wind up the charging cable, wherein the fit determination means comprises a voltage detection unit and a fit determination portion, the voltage detection unit detecting the voltage applied to the release button circuit from the vehicle to detect depression of the release button when the charge connector is fitted to the vehicle-side connector and the fit determination portion determining, based on the voltage detected by the voltage detection unit, whether or not the charge connector is fitted to the vehicle-side connector, and wherein the automatic winding-up controller determines removal of the charge connector from the vehicle-side connector based on the determination made by the fit determination means and causes the winding-up device to wind up the charging cable after the charge connector is removed from the vehicle-side connector.

In the above embodiment (1) of the invention, the following modifications and changes can be made.

(i) The charge connector conforms to one of SAE J1772 (trademark) and IEC 62196 part 3.

(ii) The fit determination means is provided on the charging equipment main body, and wherein the charging cable comprises at least five cores including a core wire for detecting the voltage applied to the release button circuit from the vehicle to detect depression of the release button.

(iii) The vehicle charging equipment further comprises a release button depression determination means that determines depression of the release button based on the voltage detected by the voltage detection unit.

(iv) The vehicle charging equipment further comprises a release button depression performing means that renders the release button circuit into a same circuit condition as the release button-pressed state when a remote interrupt signal is input from outside.

(v) The vehicle charging equipment further comprises an alarm means that stops winding the charging cable and sets off an alarm in the event of occurrence of abnormality during winding up of the charging cable.

(vi) The automatic winding-up controller is configured to control the winding-up device to wind up the charging cable at a predetermined time after removal of the charge connector from the vehicle-side connector.

According to one embodiment of the invention, a vehicle charging equipment can be provided that is adapted to automatically retract a charge connector and a charging cable regardless of which standard the vehicle conforms to.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

An embodiment of the invention will be described below in conjunction with the appended drawings.

Figure 1:
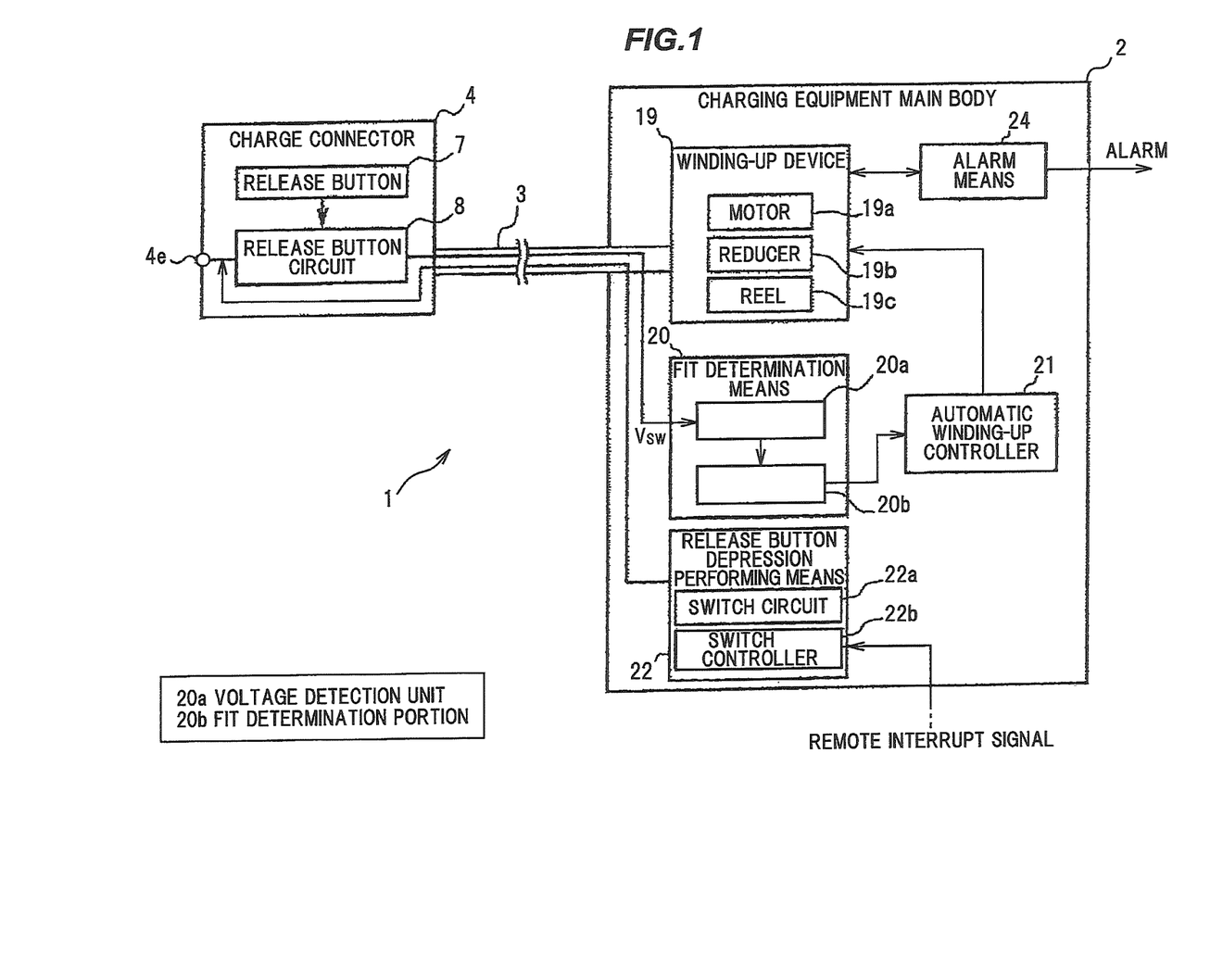
FIG. 1 is a block diagram illustrating a vehicle charging equipment in an embodiment of the present invention.
Figure 2:
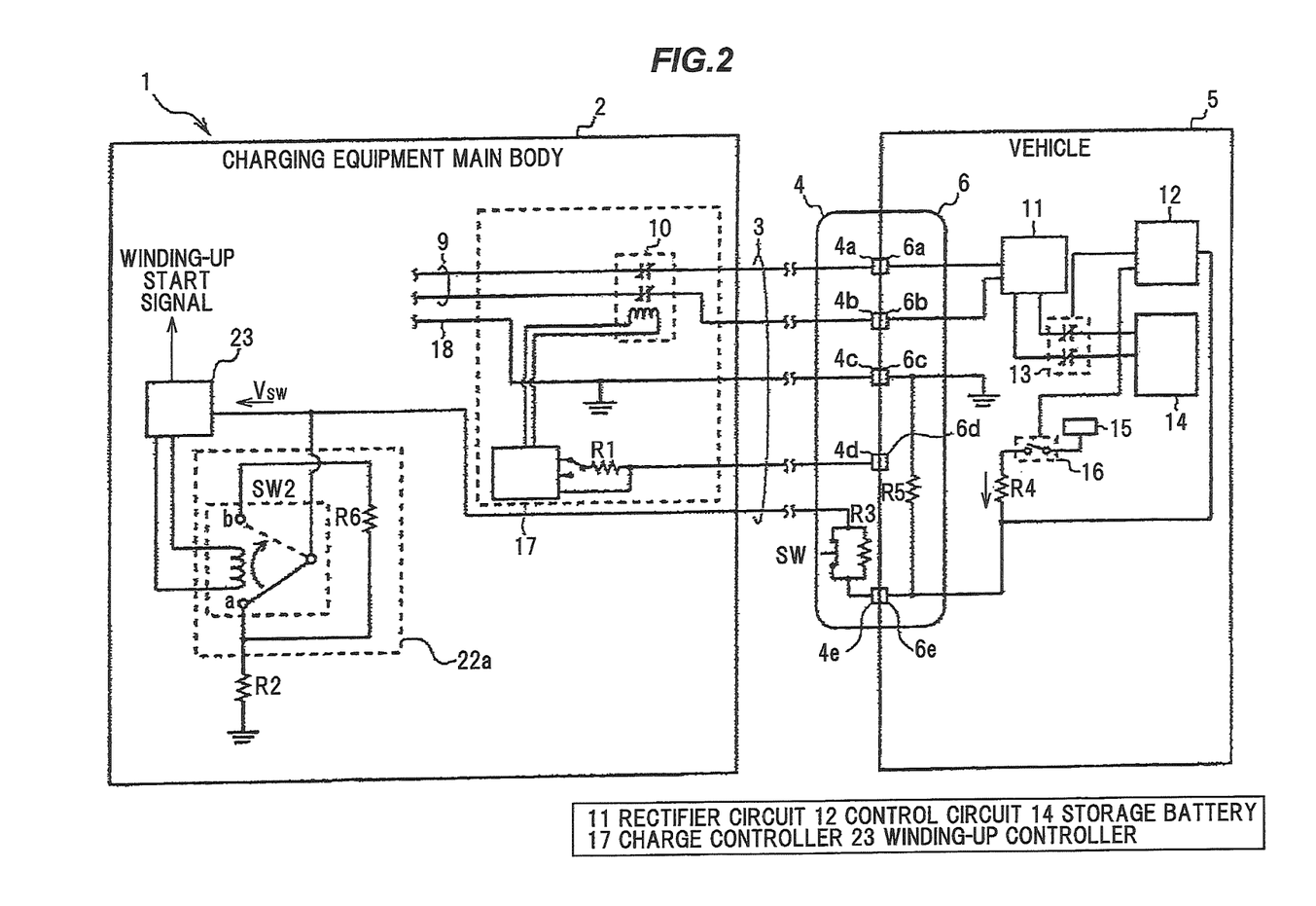
FIG. 2 is a circuit diagram illustrating the vehicle charging equipment of FIG. 1.

FIG. 1 is a block diagram illustrating a vehicle charging equipment in the embodiment and FIG. 2 is a circuit diagram thereof.

As shown in FIGS. 1 and 2, a vehicle charging equipment 1 is provided with a charging equipment main body 2, a charging cable 3 adapted to be pulled out of the charging equipment main body 2 and a charge connector 4 attached to a tip of the charging cable 3.

The charge connector 4 is fitted to a vehicle-side connector (charge port, inlet) 6 which is provided on a vehicle 5. The charge connector 4 conforms to SAE J1772 (trademark, referred to as "the J1772 standard") and is provided with five terminals: two AC power source terminals 4a and 4b through which AC power signals for charging are transmitted; a ground terminal 4c to be a frame ground (ground potential); and two signal terminals 4d and 4e. The vehicle-side connector 6 is provided with terminals 6a to 6e which respectively correspond to the terminals 4a to 4e of the charge connector 4. It should be noted that the charge connector 4 conforming to the J1772 standard will be described here and the explanation of charge connectors conforming to IEC 62196 part 3 (referred to as the 62196 standard) which have the similar structure will be omitted, however, it does not cause loss of generality.

The present embodiment described below is the case where the system in the vehicle 5 does not conform to the J1772 standard. The two connectors 4 and 6 are connected to each other via an appropriate converter plug, etc., even though it is not shown in the drawings. Although FIG. 2 shows the vehicle-side connector 6 provided with the signal terminal 6d, the vehicle-side connector 6 may not be provided with the signal terminal 6d.

The charge connector 4 is provided with a release button 7 to be pressed for removal from the vehicle-side connector 6 and a release button circuit 8 for detecting depression of the release button 7. The release button 7 is provided integrally with a locking mechanism (not shown) such as latch for locking to the vehicle 5 when the two connectors 4 and 6 are fitted to each other, and it is configured such that the locking mechanism is released by pressing the release button 7 and the fitting of the two connectors 4 and 6 is then released.

As shown in FIG. 2, the release button circuit 8 is provided with a normally-closed switch SW opened by pressing the release button 7 and two resistors R2 and R3, and is configured such that one end of the switch SW is connected to the signal terminal 4e, another end of the switch SW is connected to the frame ground via the resistor R2 and the resistor R3 is connected in parallel to the switch SW. The release button circuit 8 is configured so that a resistance value (from the signal terminal 4e to the frame ground) varies depending on with or without depression of the release button 7. Although the resistor R2 which is a part of the release button circuit 8 is provided in the charging equipment main body 2 as a matter of convenience in the present embodiment, the circuit configuration can be appropriately changed.

When the two connectors 4 and 6 are fitted to each other, AC power source lines 9 for transmitting AC power signals from the charging equipment main body 2 are connected to a rectifier circuit 11 of the vehicle 5 via a relay circuit 10 opened/closed by a charge controller 17, the charging cable 3, the AC power source terminals 4a and 4b of the charge connector 4 and the AC power source terminals 6a and 6b of the vehicle-side connector 6. The power signals rectified by the rectifier circuit 11 are introduced into a storage battery 14 via a relay circuit 13 opened/closed by a control unit 12. A ground line 18 as a frame ground (ground potential) connects between the charging equipment main body 2 and the vehicle 5 through the ground terminals 4c and 6c and the frame ground is shared on both sides.

Meanwhile, in the vehicle 5, voltage for detecting depression of the release button 7 is applied from a DC power source 15 to the signal terminal 6e (i.e., to the release button circuit 8) via a switch 16 opened/closed by the control unit 12 and via the resistor R4. The resistor R5 is inserted between the signal terminal 4e and the ground terminal 4c.

Voltage of the signal terminal 4e is monitored by the control unit 12. The control unit 12 detects variation in voltage of the signal terminal 4e and thus detects that the release button 7 is pressed. Once the control unit 12 detects that the release button 7 is pressed, the control unit 12 controls the relay circuit 13 to promptly reduce charging current, thereby preventing, e.g., damage on charging devices such as the storage battery 14 caused by transient impact due to current interruption during charging large current, or burnout of a contact due to spark discharge caused by turning off the relay circuit 13 while power is on.

Returning to FIG. 1, the vehicle charging equipment 1 in the present embodiment is provided with a winding-up device 19 provided on the charging equipment main body 2 to wind up the charging cable 3, a fit determination means 20 for determining whether or not the charge connector 4 is fitted to the vehicle-side connector 6, and an automatic winding-up controller 21 which determines removal of the charge connector 4 from the vehicle-side connector 6 based on the determination of the fit determination means 20 and causes the winding-up device 19 to wind up the charging cable 3 at a predetermined time after the removal of the charge connector 4 from the vehicle-side connector 6.

The winding-up device 19 is provided with a motor 19a, a reducer 19b for reducing output of the motor 19a, and a reel 19c rotationally driven by output of the reducer 19b to wind up the charging cable 3.

The fit determination means 20 is provided with a voltage detection unit 20a and a fit determination portion 20b. The voltage detection unit 20a detects the voltage which is applied to the release button circuit 8 from the vehicle 5 to detect depression of the release button 7 when the charge connector 4 is fitted to the vehicle-side connector 6. The fit determination portion 20b determines, based on the voltage detected by the voltage detection unit 20a, whether or not the charge connector 4 is fitted to the vehicle-side connector 6.

Although the present embodiment is configured such that voltage $V_{SW}$ of the switch SW and of the resistor R3 on the resistor R2 side (on the opposite side to the signal terminal 4e) is detected by the voltage detection unit 20a, it is not limited thereto. Voltage may be detected at any position as long as it is possible to directly or indirectly detect voltage which is applied to the release button circuit 8 from the vehicle 5 to detect depression of the release button 7.

In a state that the two connectors 4 and 6 are not fitted, voltage is not applied to the release button circuit 8 and the voltage $V_{SW}$ is thus 0. On the other hand, when the two connectors 4 and 6 are fitted to each other, the voltage $V_{SW}$ is a voltage value derived by dividing the voltage applied from the DC power source 15 into the resistor R4 and a combined resistance of the resistors R2 and R5.

Thus, in the present embodiment, the fit determination portion 20b is configured to determine that the two connectors 4 and 6 are not fitted when the voltage $V_{SW}$ detected by the voltage detection unit 20a is not more than a preset fit-determination threshold, and to determine that the two connectors 4 and 6 are fitted to each other when the voltage. $V_{SW}$ is greater than the fit-determination threshold.

When the switch SW is opened by pressing the release button 7 in a state that the two connectors 4 and 6 are fitted to each other, the voltage $V_{SW}$ changes to a value which is derived by dividing the voltage applied from the DC power source 15 into the resistor R4 and a combined resistance of the resistors (R2 and R3) and the resistor R5 and further dividing the divided voltage into the resistors R2 and R3. Therefore, it is possible to detect also depression of the release button 7 based on the voltage $V_{SW}$ detected by the voltage detection unit 20a.

That is, the vehicle charging equipment 1 may be further provided with a release button depression determination means which determines depression of the release button 7 based on the voltage $V_{SW}$ detected by the voltage detection unit 20a (the voltage applied to the release button circuit 8 from the vehicle 5 to detect depression of the release button 7). The release button depression determination means is adapted to determine that the release button 7 is pressed when, e.g., the voltage $V_{SW}$ falls within a preset threshold range.

Providing the release button depression determination means allows depression of the release button 7 to be detected not only on the vehicle 5 side but also on the charging equipment main body 2 side when the release button 7 is pressed, and it is thus possible to give such notice that "the cable will be automatically wound-up when you pull out the charge connector", thereby realizing safer operation to leave the garage/parking.

The fit determination means 20 is provided on the charging equipment main body 2. As the charging cable 3, it is necessary to use a cable with five cores (or not less than five cores) including a core wire for detecting voltage applied to the release button circuit 8 from the vehicle 5 to detect depression of the release button 7, in addition to two core wires for the AC power source lines 9, a core wire for the ground line 18 and a core wire for a signal line (control pilot signal line) used in the J1772 standard.

The vehicle charging equipment 1 is further provided with a release button depression performing means 22 which renders the release button circuit 8 into the same circuit condition as the release button-pressed state when a remote interrupt signal is input from outside.

The release button depression performing means 22 has a switch circuit 22a formed by connecting a switch SW2 and a resistor R6 in series and a switch controller 22b for controlling the switch SW2 of the switch circuit 22a.

The resistor R6 of the switch circuit 22a is set to have the same resistance value as the resistor R3 of the release button circuit 8. That is, the switch circuit 22a has exactly the same circuit configuration as the circuit formed by connecting the switch SW and the resistor R3 in series. The switch SW2 can be replaced with a normally-closed relay circuit. In the present embodiment, the switch circuit 22a is inserted between the resistor R2 and the switch SW (and the resistor R3) of the release button circuit 8.

The resistor R3 is inserted between the resistor R2 and the signal terminal 4e when the switch SW of the release button circuit 8 is opened, and similarly to this, the resistor R6 having the same resistance value as the resistor R3 is inserted between the resistor R2 and the signal terminal 4e when the switch SW2 of the switch circuit 22a is switched from a contact point-a to a contact point-b. These operations are recognized as the same on the vehicle 5 side. Therefore, by changing over the switch SW2 of the switch circuit 22a, it is possible to make the release button 7 look pressed. On the vehicle 5 side, the control unit 12 judges based on the voltage of the signal terminal 6e that the release button 7 is pressed in the same manner as the case where the release button 7 is actually pressed, and the control unit 12 controls the relay circuit 13 to promptly reduce charging current.

The voltage detection unit 20a and the fit determination portion 20b of the fit determination means 20, the automatic winding-up controller 21 and the switch controller 22b of the release button depression performing means 22 are mounted on a winding-up controller 23 shown in FIG. 2 and are implemented in an appropriate combination with a processor, a memory, an interface and a software, etc. Although the charge controller 17 for performing control related to the charging and the winding-up controller 23 are shown as separate components in FIG. 2 as a matter of convenience, the two controllers 17 and 23 may be integrated.

A remote interrupt signal input to the release button depression performing means 22, i.e., a signal for terminating the charge of the vehicle 5, is output from a central controller which controls all vehicle charging equipments 1 in the parking space in order to forcibly terminate the charge for some reasons such as for allowing the vehicle 5 to leave in the middle of the charging process. The remote interrupt signal may be an analog signal such as voltage signal or a digital signal.

Figure 3A:
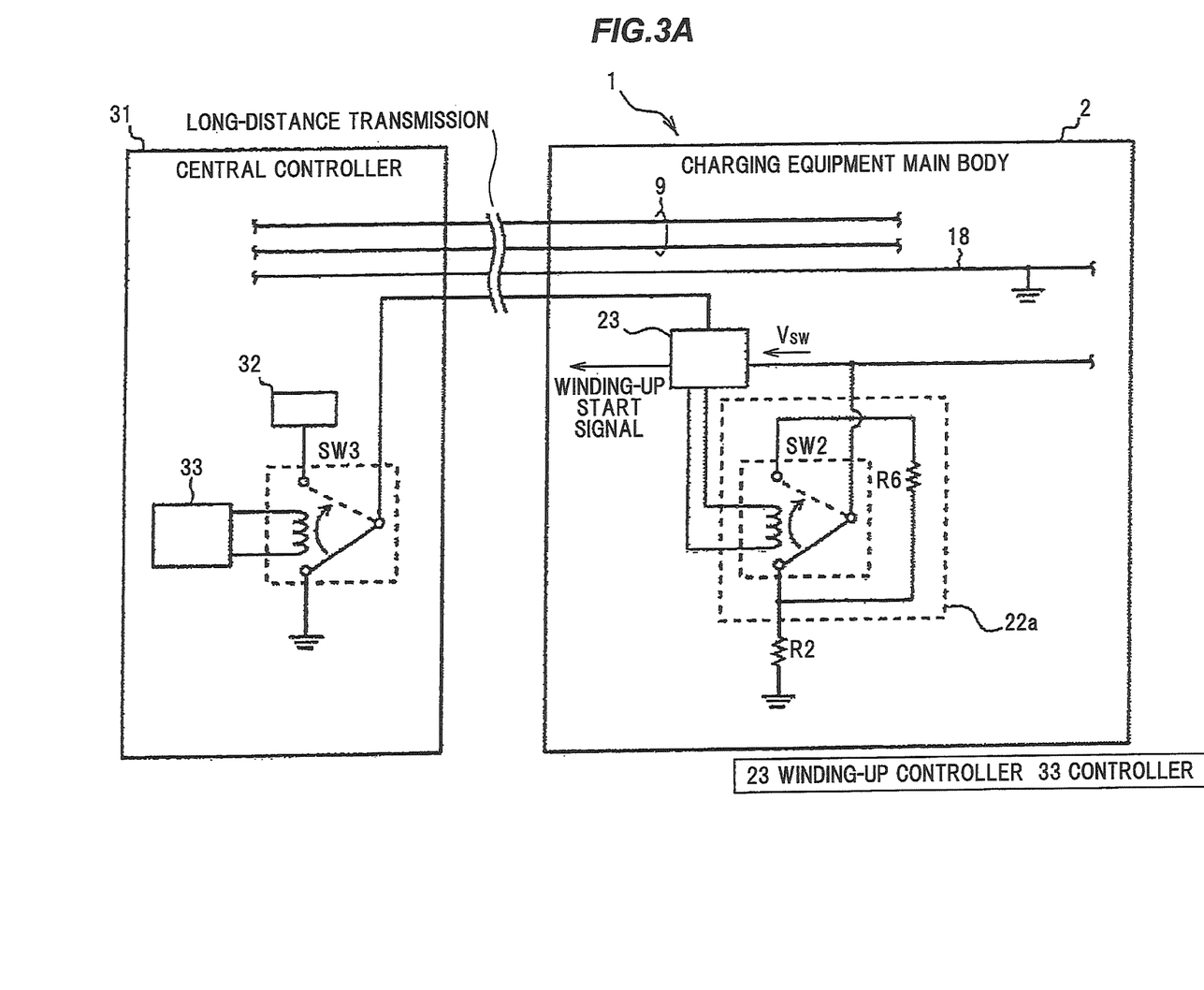
FIGS. 3A and 3B are explanatory diagrams respectively illustrating methods of outputting a remote interrupt signal in the invention.

When a voltage signal is used as the remote interrupt signal, for example as shown in FIG. 3A, it can be configured such that a central controller 31 as an output source of the remote interrupt signal is provided with a DC power source 32, a switch SW3 and a controller 33 for controlling the switch SW3, and the switch SW3 is changed over by the controller 33 to output voltage as the remote interrupt signal from the DC power source 32 or to shut off power from the DC power source 32 (not to output the remote interrupt signal).

Figure 3B:
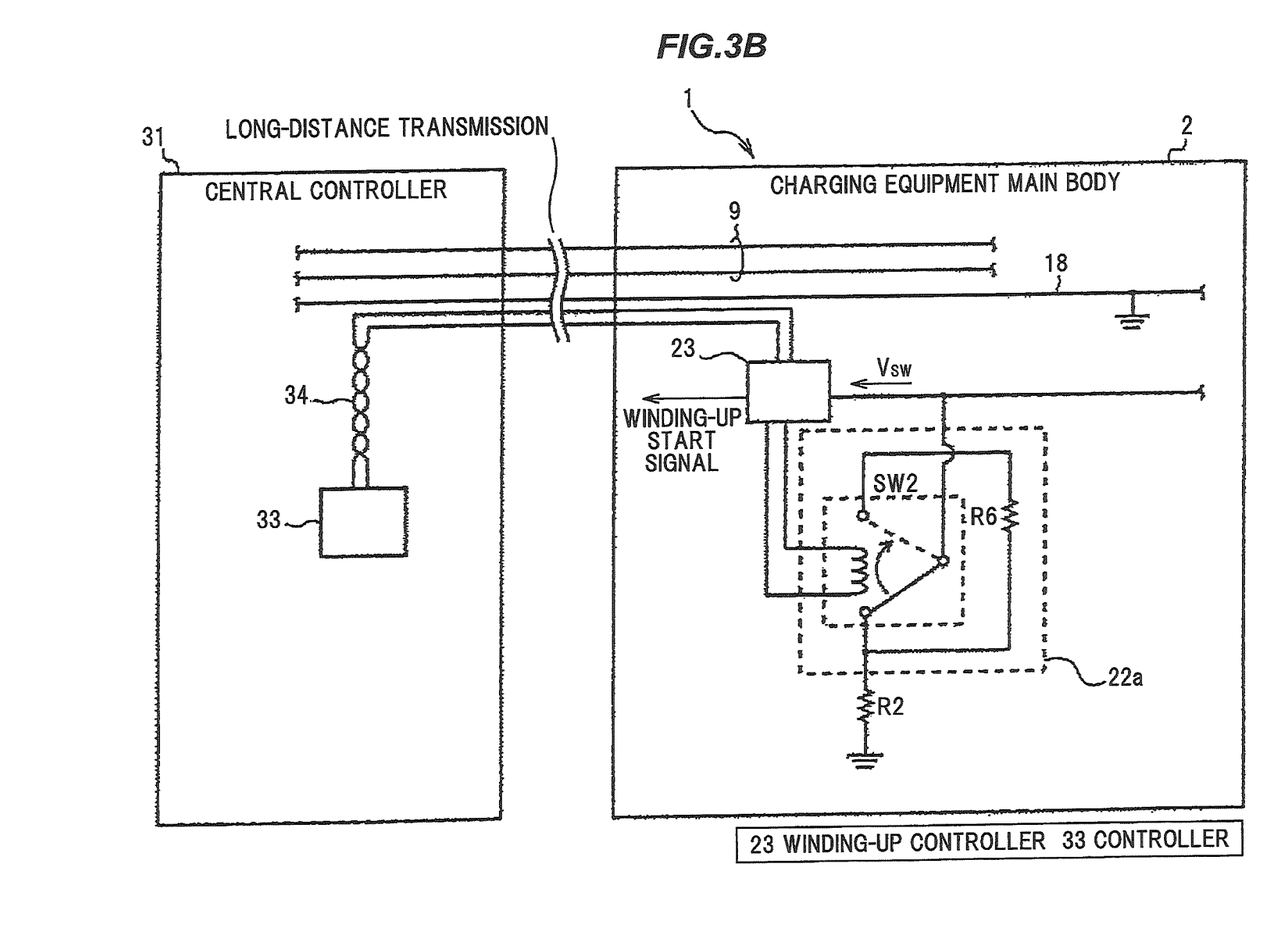

When a digital signal is use as the remote interrupt signal, for example as shown in FIG. 3B, it can be configured such that the remote interrupt signal is output from the controller 33 of the central controller 31 through a communication cable 34 such as twisted pair cable. In case that a transmission distance of the remote interrupt signal is long, voltage may decay due to transmission loss and it is thus preferable to use a digital signal.

In addition, the vehicle charging equipment 1 in the present embodiment is further provided with an alarm means 24 which stops winding the charging cable 3 and sets off an alarm in the event of occurrence of abnormality during the winding up of the charging cable 3.

The method of detecting abnormality during the winding-up of the charging cable 3 is not specifically limited and it is possible to judge that abnormality occurs when, e.g., load on the motor 19a exceeds a predetermined value or variation in load on the motor 19a exceeds a predetermined value (when the load rapidly changes).

When abnormality occurs during the winding-up of the charging cable 3, the alarm means 24 forcibly stops the motor 19a to stop winding up the charging cable 3, and sets off an alarm to the outside by, e.g., sending an abnormality occurrence signal to the central controller 31.

Next, a control flow of the vehicle charging equipment 1 in the present embodiment will be described.

Figure 4:
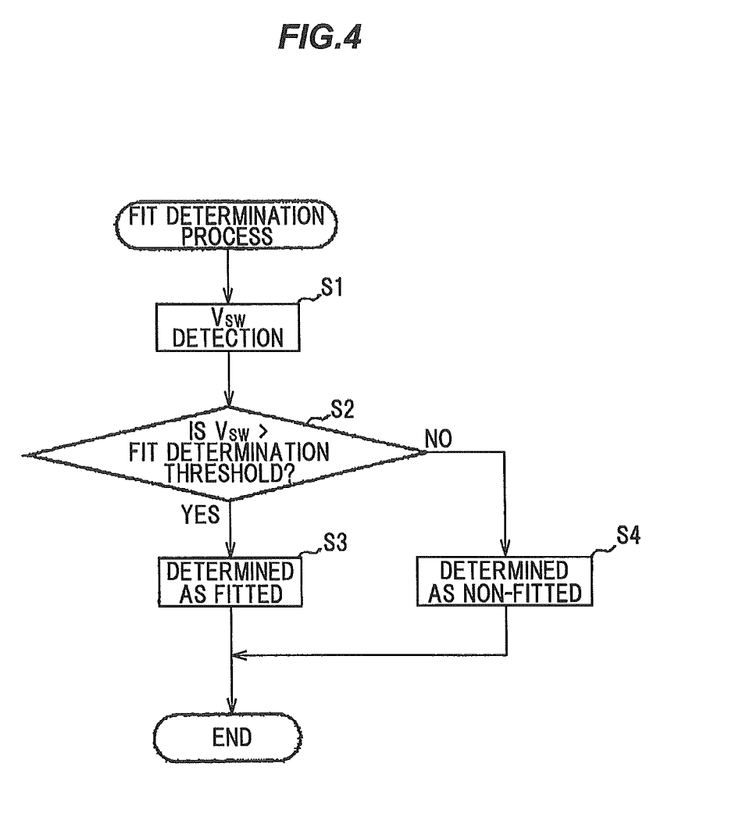
FIG. 4 is a flowchart showing a fit determination process in the vehicle charging equipment of FIG. 1.
Figure 5:
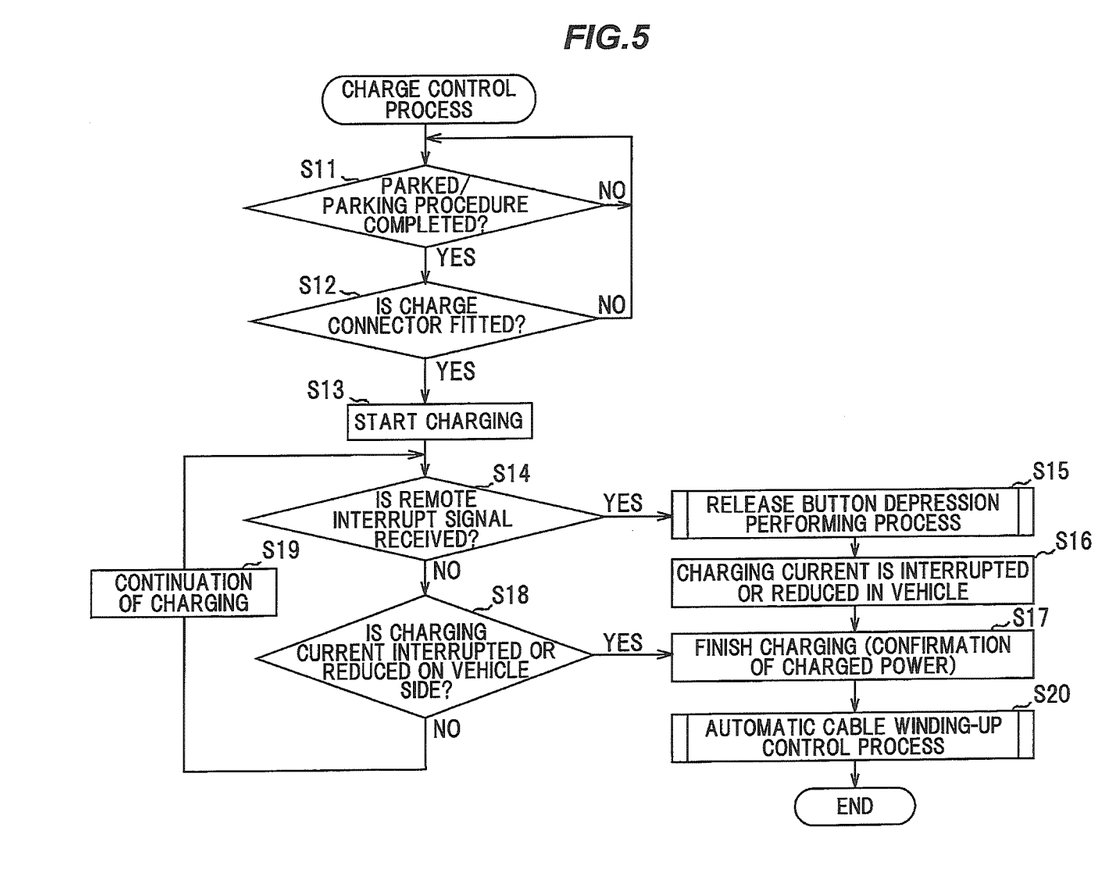
FIG. 5 is a flowchart showing a charge control process in the vehicle charging equipment of FIG. 1.

The vehicle charging equipment 1 simultaneously and repeatedly implements the fit determination process shown in FIG. 4 and the charge control process shown in FIG. 5.

In the fit determination process, firstly, the voltage detection unit 20a detects the voltage $V_{SW}$ (the voltage applied to the release button circuit 8 from the vehicle 5 to detect depression of the release button 7) in Step S1, as shown in FIG. 4.

Then, in Step S2, the fit determination portion 20b determines whether the voltage $V_{SW}$ detected in Step S1 is greater than the fit-determination threshold. When the determination in Step S2 is YES, i.e., when the voltage $V_{SW}$ is greater than the fit-determination threshold, the fit determination portion 20b determines that the two connectors 4 and 6 are fitted to each other (Step S3) and the fit determination process is terminated. When the determination in Step S2 is NO, i.e., when the voltage $V_{SW}$ is not more than the fit-determination threshold, the fit determination portion 20b determines that the two connectors 4 and 6 are not fitted (Step S4) and the fit determination process is then terminated.

In the charge control process, firstly, the charge controller 17 judges whether the vehicle 5 has been parked or parking procedure has been completed (in case of public parking space, etc.) in Step S11, as shown in FIG. 5. When the determination in Step S11 is YES, the process proceeds to Step S12 to judge whether the determination in fit determination process in FIG. 4 is that the two connectors 4 and 6 are fitted to each other. When the judgments in Step S11 and S12 are both YES, the process proceeds to Step S13 and the charge controller 17 controls the relay circuit 10 to start the charge. When judgment in Step S11 or S12 is NO, the process proceeds back to Step S11.

After starting the charge in Step S13, the switch controller 22b of the release button depression performing means 22 judges whether the remote interrupt signal is received from the outside in Step S14.

When the judgment in Step S14 is YES, i.e., when the release button depression performing means 22 receives the remote interrupt signal, the release button depression performing means 22 performs a release button depression performing process in Step S15. In the release button depression performing process, the switch controller 22b changes over the switch SW2 of the switch circuit 22a to insert the resistor R6 between the release button circuit 8 and the resistor R2.

Once the release button depression performing process is performed in Step S15, it is judged on the vehicle 5 side that the release button 7 is pressed and charging current is thus promptly reduced and is then interrupted or reduced to a value close to zero (Step S16). Then, the charging process is finished (Step S17). In public parking spaces, etc., an integrated value of the charged power is confirmed in Step S17.

On the other hand, when the judgment in Step S14 is NO, it is judged in Step S18 whether the charging current is manually interrupted or reduced to a value close to zero on the vehicle 5 side.

When the judgment in Step S18 is YES, this means that the release button 7 is actually pressed or the charging current is interrupted on the vehicle 5 side because enough electricity is charged or some abnormality is detected. Therefore, the process proceeds to Step S17 and the charging process is terminated.

When the judgment in Step S18 is NO, this means that the remote interrupt signal is not received and also it is judged that the vehicle 5 is not sufficiently charged. Therefore, the charge continues (Step S19) and the process proceeds back to Step S14.

After finishing the charge in Step S17, the process proceeds to Step S20 to perform an automatic cable winding-up control process and the charge control process is then terminated.

Figure 6:
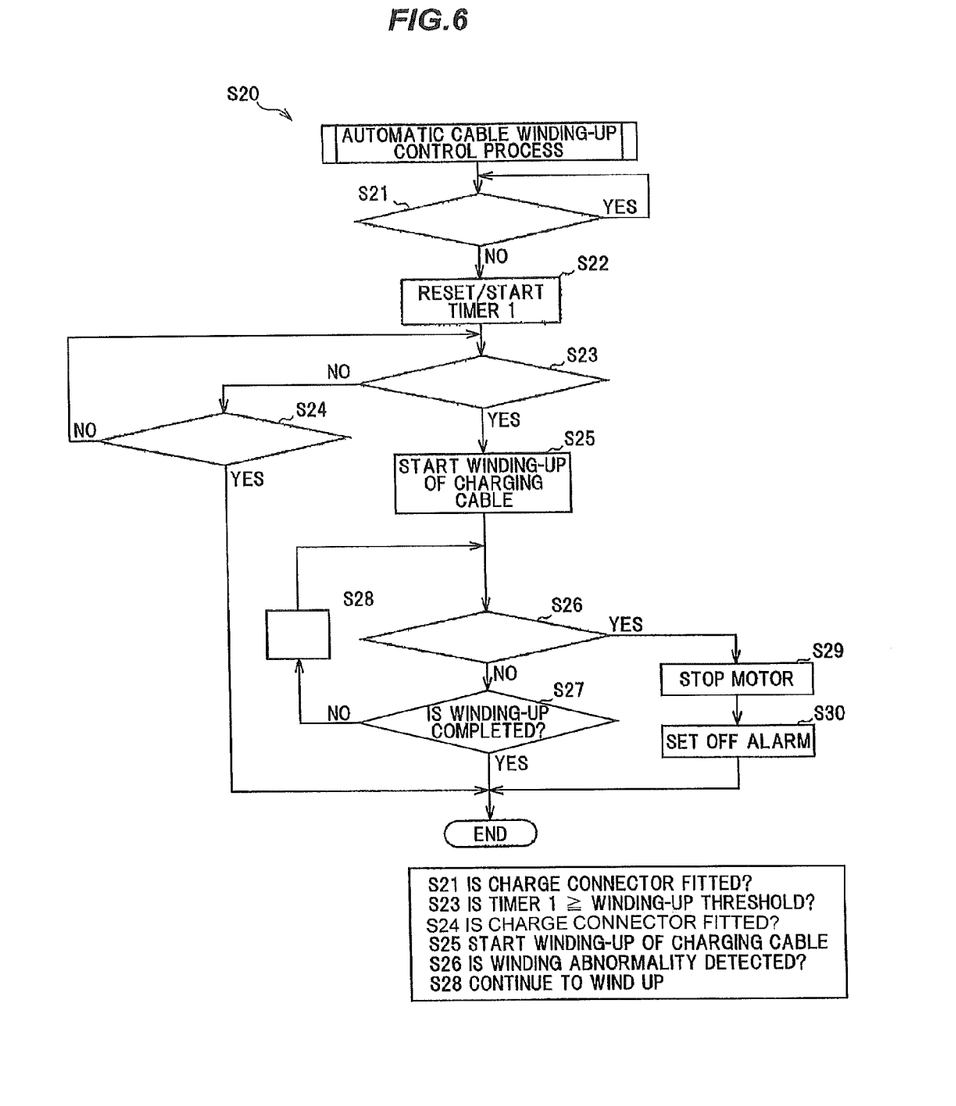
FIG. 6 is a flowchart showing an automatic cable winding-up control process in the charge control process of FIG. 5.

In the automatic cable winding-up control process of Step S20, firstly, the automatic winding-up controller 21 judges in Step S21 whether the determination in the fit determination process of FIG. 4 is that the two connectors 4 and 6 are fitted to each other, as shown in FIG. 6.

When the judgment in Step S21 is YES, the charge connector 4 is still fitted to the vehicle-side connector 6 and the process thus proceeds back to Step S21. When the judgment in Step S21 is NO, this means that the charge connector 4 is removed from the vehicle-side connector 6. Therefore, a timer 1 is reset and started in Step S22 and then the process proceeds to Step S23.

In Step S23, it is judged whether the elapsed time of the timer 1 is not less than a preset winding-up threshold (e.g., 3 to 5 seconds). When the judgment in Step S23 is NO, it is judged again in Step S24 whether the two connectors 4 and 6 are fitted to each other. And when the judgment in Step S24 is NO, the process proceeds back to Step S23.

When the charge connector 4 is kept removed until the elapsed time of the timer 1 reaches the winding-up threshold, it is judged YES in Step S23 and the process proceeds to Step S25. If the charge connector 4 is fitted to the vehicle-side connector 6 again before the elapsed time of the timer 1 reaches the winding-up threshold, it is judged YES in Step S24 and the automatic cable winding-up control process is terminated without winding up the charging cable 3.

In Step S25, the automatic winding-up controller 21 sends a winding up start signal to the winding-up device 19 to drive the motor 19a and thereby to start winding up the charging cable 3.

After that, in Step S26, the alarm means 24 judges whether winding abnormality is occurring. When the judgment in Step S26 is NO, the automatic winding-up controller 21 judges in Step S27 whether the winding-up of the charging cable 3 is completed. When the judgment in Step S27 is NO, this means that no winding abnormality is occurring and the winding-up is not completed yet. Therefore, the charging cable 3 is continuously wound up (Step S28) and the process proceeds back to Step S26. When the judgment in Step S27 is YES, this means that the winding-up of the charging cable 3 is properly completed and the automatic cable winding-up control process is terminated.

A method for judging completion of the winding-up in Step S27 is not specifically limited. For example, an amount of pull-out rotation, which is the number of rotations of the reel 19c when the charging cable 3 is pulled out, is preliminarily memorized so that it is possible to judge that the winding-up is properly completed when the rotation amount of the reel 19c rotated at the time of winding up is identical to the memorized amount of pull-out rotation.

When the judgment in Step S26 is YES, i.e., when winding abnormality is occurring, the alarm means 24 forcibly stops the motor 19a (Step S29) and also sets of an alarm to the outside (Step S30) and the automatic cable winding-up control process is terminated.

Effects of the present embodiment will be described.

In the vehicle charging equipment 1 of the present embodiment, the fit determination means 20 is composed of the voltage detection unit 20a and the fit determination portion 20b such that the voltage detection unit 20a detects voltage applied to the release button circuit 8 from the vehicle 5 to detect depression of the release button 7 when the charge connector 4 is fitted to the vehicle-side connector 6, and the fit determination portion 20b determines, based on the voltage detected by the voltage detection unit 20a, whether the charge connector 4 is fitted to the vehicle-side connector 6.

Since the mechanism for detecting depression of the release button 7 is generally provided on electric or hybrid vehicles, the configuration described above allows the fitting of the charge connector 4 to the vehicle-side connector 6 to be detected even in case that the vehicle 5 does not conform to the J1772 standard.

In other words, according to the invention, it is possible to realize the vehicle charging equipment 1 which can detect the fitting of the charge connector 4 regardless of the standard to which the vehicle 5 conforms. This allows the charging cable 3 and the charge connector 4 to be securely retracted after charging by automatically winding up the charging cable 3 using the winding-up device 19 or the automatic winding-up controller 21 and it is thus possible to prevent troubles such as damages caused by leaving the charge connector 4 and the charging cable 3 uncared-for.

In addition, since it is possible to reliably detect the fitting of the charge connector 4 on the charging equipment main body 2 side regardless of the standard to which the vehicle 5 conforms, it is possible to safely charge, for example, the relay circuit 10 is interrupted in the non-fitted state so as not to output AC power signals.

In addition, in the present embodiment, the release button depression performing means 22 is further provided to render the release button circuit 8 into the same circuit condition as the state in which the release button 7 is pressed when a remote interrupt signal is input from outside. As a result, it is possible to remotely control interruption of the charge.

The release button depression performing means 22 can be realized only by adding the switch circuit 22a composed of the switch SW2 and the resistor R2 in terms of hardware, which is very low cost. In addition, in the present embodiment, a part of the release button circuit 8 is drawn into the charging equipment main body 2 to detect the voltage applied to the release button circuit 8 and use of this configuration allows the release button depression performing means 22 to be easily incorporated into the charging equipment main body 2 at low cost.

In addition, in the present embodiment, since the alarm means 24 judges in the automatic cable winding-up control process of FIG. 6 whether or not winding abnormality is occurring and then stops the motor 19a, it is possible to reduce breakage of the charging cable and the winding-up device 19 during winding-up.

Furthermore, in the present embodiment, the automatic winding-up controller 21 is adapted to control the winding-up device 19 to wind up the charging cable 3 at a predetermined time after removal of the charge connector 4 from the vehicle-side connector 6. Therefore, even when the charge connector 4 is fitted to charge again immediately after the removal of the charge connector 4, it is possible to easily fit the charge connector 4 again while an operating person is not subjected to a tensile force of the winding-up device 19 generated by winding up the charging cable 3.

It should be noted that the present invention is not intended to be limited to the embodiment and the various kinds of modifications can be implemented without departing from the gist of the invention.

What is claimed is:

1. A vehicle charging equipment, comprising:
    a charging equipment main body;
    a charging cable to be pulled out of the charging equipment main body;
    a charge connector that is provided at a tip of the charging cable, is to be fitted to a vehicle-side connector on a vehicle and has a release button to be pressed for removal from the vehicle-side connector;
    a release button circuit to which voltage is applied from the vehicle to detect depression of the release button, the release button circuit having a resistance value that varies depending on whether or not the release button is pressed;
    a winding-up device on the charging equipment main body to wind up the charging cable;
    a fit determination means for determining whether or not the charge connector is fitted to the vehicle-side connector; and
    an automatic winding-up controller for controlling the winding-up device to wind up the charging cable,
    wherein the fit determination means comprises a voltage detection unit and a fit determination portion, the voltage detection unit detecting the voltage applied to the release button circuit from the vehicle to detect depression of the release button when the charge connector is fitted to the vehicle-side connector and the fit determination portion determining, based on the voltage detected by the voltage detection unit, whether or not the charge connector is fitted to the vehicle-side connector, and
    wherein the automatic winding-up controller determines removal of the charge connector from the vehicle-side connector based on the determination made by the fit determination means and causes the winding-up device to wind up the charging cable after the charge connector is removed from the vehicle-side connector.

2. The vehicle charging equipment according to claim 1, wherein the charge connector conforms to one of SAE J1772 (trademark) and IEC 62196 part 3.

3. The vehicle charging equipment according to claim 1, wherein the fit determination means is provided on the charging equipment main body, and
    wherein the charging cable comprises at least five cores including a core wire for detecting the voltage applied to the release button circuit from the vehicle to detect depression of the release button.

4. The vehicle charging equipment according to claim 1, further comprising a release button depression determination means that determines depression of the release button based on the voltage detected by the voltage detection unit.

5. The vehicle charging equipment according to claim 1, further comprising a release button depression performing means that renders the release button circuit into a same circuit condition as the release button-pressed state when a remote interrupt signal is input from outside.

6. The vehicle charging equipment according to claim 1, further comprising an alarm means that stops winding the charging cable and sets off an alarm in the event of occurrence of abnormality during winding up of the charging cable.

7. The vehicle charging equipment according to claim 1, wherein the automatic winding-up controller is configured to control the winding-up device to wind up the charging cable at a predetermined time after removal of the charge connector from the vehicle-side connector.

* * * * *